United States Patent [19]

Onishi et al.

[11] Patent Number: 4,922,761

[45] Date of Patent: May 8, 1990

[54] STEERING TORQUE DETECTOR

[75] Inventors: Masayoshi Onishi; Hiromasa Ozawa; Hisato Umemaru, all of Hyogo, Japan

[73] Assignee: Mitsubishi Denki Kabushiki Kaisha, Tokyo, Japan

[21] Appl. No.: 313,844

[22] Filed: Feb. 23, 1989

[30] Foreign Application Priority Data

| Feb. 25, 1988 | [JP] | Japan | 63-45077 |
| Feb. 25, 1988 | [JP] | Japan | 63-45079 |
| Feb. 25, 1988 | [JP] | Japan | 63-45096 |
| Feb. 25, 1988 | [JP] | Japan | 63-45078 |
| Feb. 26, 1988 | [JP] | Japan | 63-45148 |

[51] Int. Cl.$^5$ ............................................. G01L 3/10
[52] U.S. Cl. .................................................. 73/862.33
[58] Field of Search ..................... 73/862.33; 180/79.1

[56] References Cited

U.S. PATENT DOCUMENTS 4,660,671 4/1987 Behr et al. .

FOREIGN PATENT DOCUMENTS

0286053 10/1988 European Pat. Off. .

*Primary Examiner*—Charles A. Ruehl
*Attorney, Agent, or Firm*—Sughrue, Mion, Zinn, Macpeak & Seas

[57] ABSTRACT

A steering torque detector includes input and output shafts, a torsion bar connected between the input and the output shafts, a printed circuit board attached to the input shaft or output shaft and resistor layers and electrode as a potentiometer, having a mounting ring made of electric insulator and fitted around both the input and output shafts, and a slider attached to the mounting ring and elastically kept in contact with the resistor layers at the slider. The potentiometer includes main and auxiliary circuits each having the resistor layer and the electrode, the resistor layers of both circuits being located at a distance from each other in the radial direction of the detector and extending along mutually concentric circles through the same range of central angle of the detector. The slider includes a main slider kept in contact with the resistor layer of the main circuit at one end thereof, and an auxiliary slider kept in contact with the resistor layer of the auxiliary circuit at one end thereof. Both the main and auxiliary sliders are located at a distance from each other in the radial direction and extending along mutually concentric circles so that the one ends of both the main and auxiliary sliders are positioned on the radial direction.

5 Claims, 8 Drawing Sheets

STEERING TORQUE DETECTOR

BACKGROUND OF THE INVENTION

1. Field of the Invention

The present invention relates to a steering torque detector for the electric power steering gear of a vehicle such as a motor vehicle, and particularly relates to a steering torque detector improved so that the ends of sliders, which are kept in contact with the neutral points of the resistor layers of a potentiometer having two circuits, are located on the same radius of the detector.

2. Prior Art

In a conventional steering torque detector disclosed in the Japanese Utility Model Application No. 91811/87, the input and output steering shafts of a steering gear are coupled to each other by a torsion bar. A printed circuit board provided with elements of a potentiometer is attached to the input steering shaft. Sliders are attached to a mounting ring attached to the output steering shaft. The tips of the sliders, which project out in parallel with the axis of the detector, are kept in contact with resistor layers which are some of the elements of the potentiometer. When the torsion bar is twisted by moving the steering wheel of the steering gear, the sliders in contact with the resistor layers are displaced in the circumferential direction of the detector so that detection signals proportional to the quantity of the displacement are sent out from the potentiometer.

Figure 1:
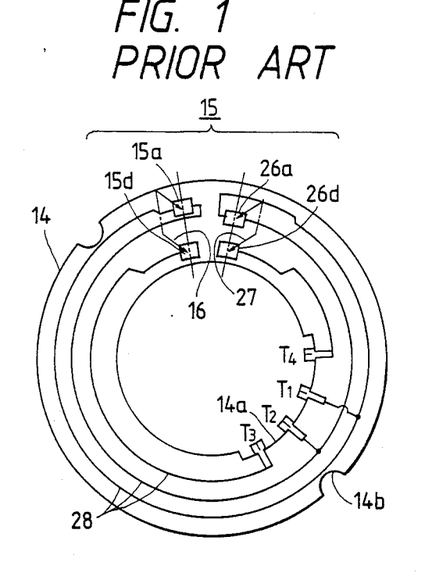
FIG. 1 shows a front view of a printed circuit board in a conventional steering torque detector.

FIG. 1 shows the printed circuit board 14 for forming the main and auxiliary circuits of the potentiometer. The board 14 is shaped as a disk and secured to the flange of a support ring fitted with slip rings. The potentiometer elements 15, which are for forming the main and the auxiliary circuits, are provided on one side of the printed circuit board 14 and located on mutually concentric circles. Some of the potentiometer elements 15 are the resistor layer 15a and electrode 15d of the main circuit. The others of the potentiometer elements 15 are the resistor layer 26a and electrode 26d of the auxiliary circuit. The resistor layers 15a and 26a are located at a circumferential distance from each other on the same circle. The electrodes 15d and 26d are located at radial distances from the resistor layers 15a and 26a and extend throughout the same ranges of central angle of the printed circuit board 14 as the resistor layers. A positive power input terminal T1 and a negative power input terminal T2 for the potentiometer are connected to a detecting power supply through lines 28. Signal output terminals T3 and T4 for the potentiometer are connected to the main and the auxiliary circuits through other lines 28. The printed circuit board 14 has a notch 14a through connection lines extending from the slip rings are laid. The board 14 also has a notch 14b for positioning the board relative to the flange of the support ring.

Figure 2:
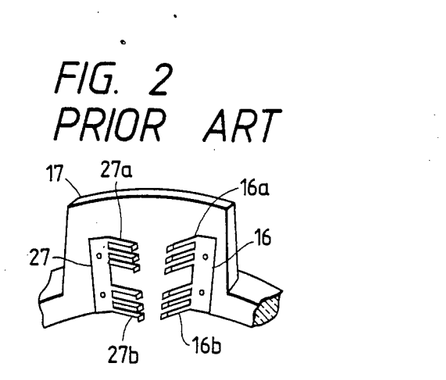
FIG. 2 shows a prespective view of the slider mounting part of the mounting ring in the conventional steering torque detector.

FIG. 2 shows the main slider 16 and auxiliary slider 27 of the conventional steering torque detector. The sliders 16 and 27 are also for forming the main and auxiliary circuits of the potentiometer. The mounting ring 17 made of an electric insulator is fitted around the output steering shaft and secured by screws not shown in the drawings. The main slider 16 and the auxiliary slider 27 are attached to one side of the mounting ring 17 so that the tips of the projecting portions of the main slider are located in contact with the resistor layer 15a and the electrode 15d which are located away from each other in the radial direction of the printed circuit board 14, and the tips of the projecting portions of the auxiliary slider are located in contact with the resistor layer 26a and the electrode 26d which are located away from each other in the radial direction of the board. The circumferential length of the area of the contact between each of the tips of the projecting portions of the main and the auxiliary sliders 16 and 27 and each of the resistor layers 15a and 26a and the electrodes 15d and 26d is very small.

Figure 3:
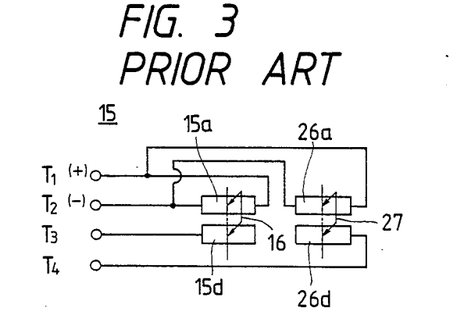
FIG. 3 shows a wring diagram of a potentiometer included in the conventional steering torque detector and composed of potentiometer elements and sliders.

FIG. 3 shows the main and auxiliary circuits of the potentiometer, which are composed of the potentiometer elements 15 and the sliders 16 and 27. The detection signal of the main circuit is sent out from the signal output terminal T3, while that of the auxiliary circuit is sent out from the other signal output terminal T4.

When the steering wheel is not moved, the sliders 16 and 27 are in contact with the neutral points of the resistor layers 15a and 26a, respectively. When the steering wheel is moved, the torsion bar is twisted depending on the torque of the wheel, so that the sliders 16 and 27 are displaced by the same angle as each other from the neutral points of the resistor layers 15a and 26a as the sliders remain in contact therewith. At that time, the detection signal of the main circuit is compared with that of the auxiliary circuit. If the detection signals are equal to each other in level, the main circuit is judged to be normal, so that a steering electric motor is rotated by the detection signal of the main circuit. If the detection signals are not equal to each other in level, at least one of the resistor layers 15a and 26a is judged to be abnormal, so that a warning is displayed or sounded. The reliability of the steering torque detector is thus enhanced.

Figure 4:
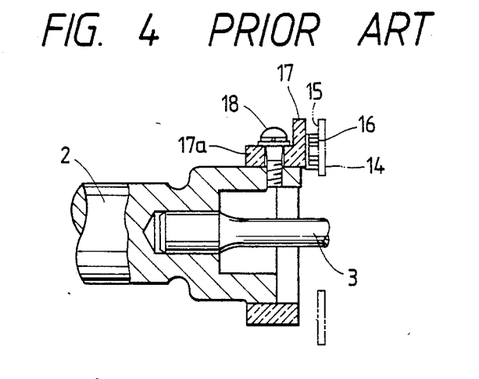
FIG. 4 shows a longitudinally sectional view indicative of a means engaged with the mounting ring of a conventional steering torque detector to determine the position of the ring in the circumferential direction of the detector.
Figure 5:
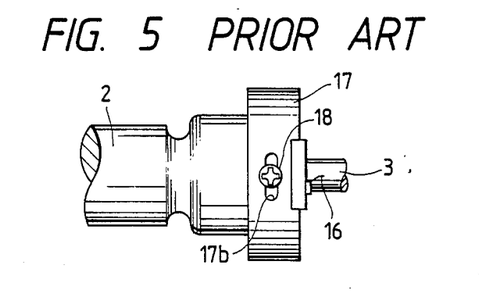
FIG. 5 shows a plan view indicative of the means of the conventional steering torque detector.

FIGS. 4 and 5 show the slider 16 of the conventional steering torque detector is attached to a mounting ring 17, as shown in FIGS> 4 and 5. The mounting ring 17 is made of a synthetic resin and has a slender hole 17b provided in the body 17a of the ring and slenderly extending in the circumferential direction thereof. After the mounting ring 17 is fitted on the output steering shaft 2, the position of the mounting ring is adjusted relative to the shaft in the circumferential direction thereof so that the end of the slider 16 is placed on the neutral point of the resistor layer. The mounting ring 17 is then secured to the output steering shaft 2 by a screw 18.

Figure 6:
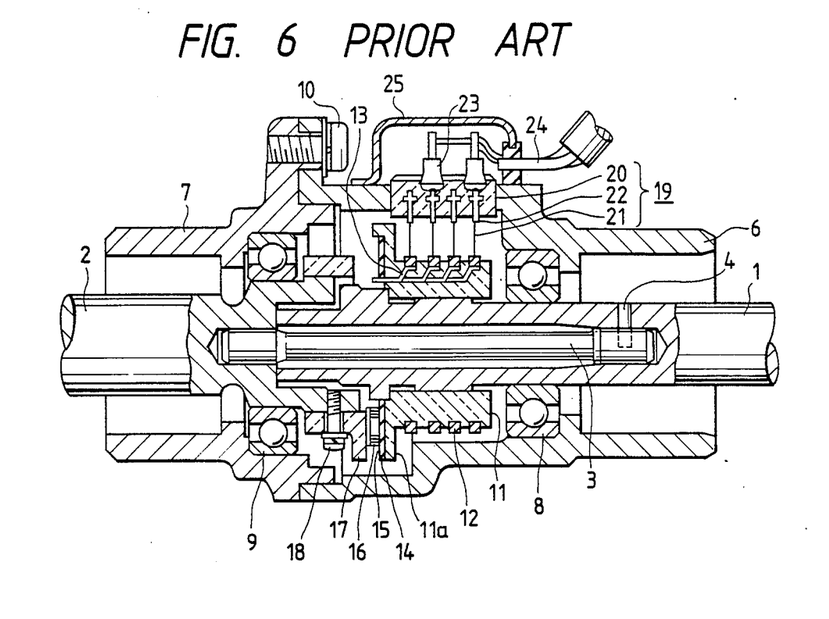
FIG. 6 shows a longitudinally sectional view of a conventional steering torque detector.

FIG. 6 shows a longitudinally sectional view of a conventional steering torque detector disclosed in the above mentioned Japanese Utility Model Application No. 91811/87. In the detector, the input and output steering shafts 1 and 2 of a steering gear are coupled to each other by a torsion bar 3. A pin 4 is secured to the input steering shaft 1 and the torsion bar 3. A housing 6 is supported on a fixed section not shown in the drawing and supports the input steering shaft 1 with a bearing 8. Another housing 7 is coupled to the former housing 6 by screws 10 and supports the output steering shaft 2 with a bearing 9. A support ring 11 for a plurality of slip rings 12 is molded from a synthetic resin and secured to the input steering shaft 1 and has a flange 11a. The slip rings 12 are embedded in the support ring 11 and connected to electric wires 13. A printed circuit board 14 shaped as a disk is secured to the flange 11a of the support ring 11 and provided with elements 15 of a potentiometer. A resistor layer extending in the circumferential direction of the printed circuit board 14 and a plurality of electrodes are the potentiometer elements 15.

A mounting ring 17 made of an electric insulator is fitted around the output steering shaft 2 and secured thereto by a screw 18. A slider 16 is attached to the mounting ring 17 and extends from the resistor layer of the potentiometer to the electrode thereof so that the slider is in contact with the resistor layer and the electrode. A brush unit 19 includes a bush holder 20 made of an electric insulator and attached to the housing 6, brushes 21 made of thin elastic wires of high electric conductivity and having a spring-like property, and terminals 22 embedded in the brush holder and connected to lead wires 24 through capacitors 23. The brushes 21 extend in contact with the slip rings 12 at the tips of the brushes, in the tangential directions of the slip rings, and are secured to the terminals 22 at the butts of the brushes. A cover 25 is provided around the brush unit 19.

Figure 7:
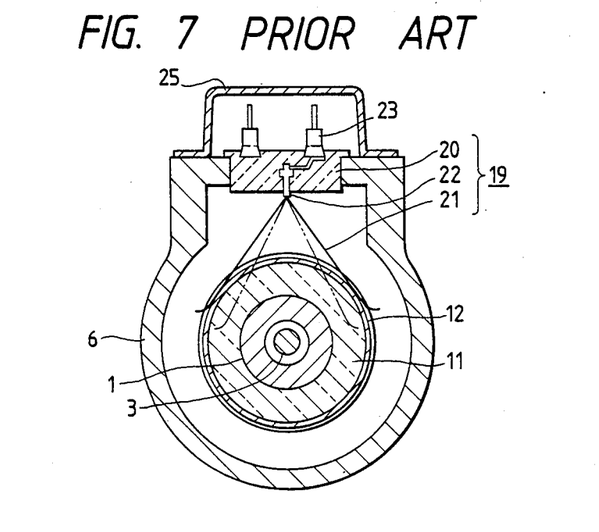
FIG. 7 shows a cross-sectional view of the conventional steering torque detector.

FIG. 7 shows the slip ring 12 and the brush unit 19. Each of the brushes 21 of the brush unit 19 is made of the thin elastic wires divergently extending in two mutually different directions from the butts of the wires toward the tips thereof and elastically deformed in contact with the peripheral surface of the corresponding slip ring 12. Before the thin wires of the brush 21 are elastically deformed into contact with the peripheral surface of the slip ring 12, the wires extend as shown by one-dot chain lines in FIG. 7.

However, the conventional detector as described above has the following problems:

First, since the main resistor layer 15a and the auxiliary resistor layer 26a are located at the circumferential distance from each other and the main slider 16 and the auxiliary slider 27 are also located at a circumferential distance from each other, it is not easy to place the sliders in contact with the neutral points of the resistor layers and requires highly accurate processing and assembly. Besides, if the printed circuit board 14 and the mounting ring 17 become eccentric to each other, the tips of the sliders 16 and 27 deviate from the neutral points of the resistor layers 15a and 26a to lower the accuracy of the output characteristic of the steering torque detector.

Also, the main and auxiliary circuits of the potentiometer of the conventional steering torque detector need to be equal to each other in signal characteristic in the normal state of the detector assembled. For that reason, it is necessary to make the processing and assembly of the components of the detector. This results in lowering the productivity for the detector.

Further, in the conventional detector, it is troublesome and time-consuming to finely adjust the position of the mounting ring 17 relative to the output steering shaft 2 in the circumferential direction thereof. Besides, the screw 18 for securing the mounting ring 17 to the output steering shaft 2 is likely to loosen due to the long period use of the detector or the secular shrinkage of the mounting ring so as to let the ring be displace in the circumferential direction of the shaft to shift the position of the slider 16 from the neutal point of the resistor layer. For that reason, the detection signal is likely to become an improper one.

Still further, in the conventional detector, the inner end of the boss of the mounting ring of the steering torque detector and the surface of the printed circuit board thereof, which is kept in pressure contact with the outer end of the boss under the pressure of the spring which is applied to the ring and the board, become worn because of slipping on each other as the input and the output steering shafts are turned relative to each other along with the twisting of the torsion bar at the time of the movement of the steering wheel of the steering gear. Therefore, the life of the detector is shortened. This is a problem.

Still further, in the conventional detector, the distance between the tips of the thin elastic wires of each brush 21 before the brush unit 19 is attached to the housing 6 so as to elasticaly deform the wires into contact with the peripheral surface of the corresponding slip ring 12 is smaller than that after the brush unit is attached to the housing so as to elastically deform the wires into contact with the peripheral surface of the slip ring. For that reason, it is likely that before the brush holder 20 is put into the insertion hole of the housing 6, the tips of the thin elastic wires of each brush 21 do not go into prescribed positions of the corresponding slip ring 12, but go into contact with a wrong portion and bend or go onto a wrong slip ring to cause a short circuit or an improper signal.

SUMMARY OF THE INVENTION

The present invention was made in order to solve the above-mentioned problems.

Accordingly, it is an object of the present invention to provide a steering torque detector in which it is easy to accurately place main and auxiliary sliders in contact with the neutral points of main and auxiliary resistor layers so that the accuracy of the output characteristic of the detector does not fall even if a printed circuit board and a mounting ring become eccentric to each other. The potentiometer of the detector has main and auxiliary circuits. The main and auxiliary resistor layers are provided on the printed circuit board so that the resistor layers are located at a distance from each other in the radial direction of the detector, and extend along mutually concentric circles, throughout the same range of central angle of the cross section of the detector. The main and auxiliary sliders are attached to the mounting ring and are kept in a contact with the main and the auxiliary resistor layers at the ends of the sliders so that the ends are on the same radius of the detector. When a steering wheel is not moved the main and the auxiliary sliders are in contact with the neutral points of the main and the auxiliary resistor layers on the same radius of the detector. When the steering wheel is moved, a torsion bar coupling an input and an output steering shafts to each other is twisted so that the points of the main and the auxiliary sliders, which are in contact with the main and the auxiliary resistor layers, are displaced by an equal central angle of the cross section of the detector, depending on the quantity of the twisting of the torsion bar. As a result, the detection signals of the main and the auxiliary circuits are accurately equalized to each other in level normally. When the signals are equal to each other in level, the main circuit is judged to be normal. If the signals are not equal to each other in level, the main circuit is judged to be abnormal and a warning is sounded or displayed. Since the accuracy of detection of steering torque through the main and the auxiliary circuits is thus enhanced, the reliability of the steering torque detector is heightened.

It is another object of the present invention to provide a method of forming and assembling the main and auxiliary sliders of a steering torque detector. In the method, the sliders are formed together along each other by punching as the sliders remain coupled to each other at joints located on the halfway portions of the sliders. The sliders are then attached to a mounting ring. The joints are thereafter cut off so that the sliders are uncoupled from each other. It is thus made easy to assemble the steering torque detector so that the main and the auxiliary sliders extend along mutually concentric circles and the mutually corresponding ends of the sliders are accurately placed at the same central angle of the cross section of the detector.

It is a further object of the present invention to provide a steering torque detector which can be preadjusted to equalize the detection signals of the main and auxiliary circuits of a potentiometer to each other in level so as to enable the reduction in the accuracy of processing and assembly of the component of the detector to enhance the productivity therefor. An adjusting resistor is connected in series with the resistor layer of one of the main and the auxiliary circuits to easily perform the preadjustment. Besides, since it can be surely judged whether the main and the auxiliary circuits are normal or abnormal when a steering wheel is moved, the reliability of the detector is enhanced.

It is a still further object of the present invention to provide a steering torque detector in which the position of a mounting ring relative to one of an input and an output steering shafts in the circumferential direction thereof can be easily finely adjusted to place the end of a slider in contact with the neutral point of a resistor layer which is one of potentiometer elements provided on a printed circuit board attached to the other of the shafts. An eccentric pin, which has a head eccentric to the shank of the pin, is calked to the one shaft so tightly that the pin cannot be turned and loosened without using a wrench to which a strong turning force is applied. The pin is engaed in the engaging groove of the cylindrical projecting portion of the mounting ring to determine the position of the ring relative to the one shaft in the circumferential direction thereof. After the printed circuit board and the mounting ring are attached to the shafts, respectively, the eccentric pin is turned by the wrench to rotate the mounting ring in the circumferential direction thereof to finely adjust the position of the ring in that direction to place the end of the slider in contact with the neutral point of the resistor layer. For that reason, it is easy to finely adjust the position of the mounting ring relative to the one shaft in the circumferential direction thereof to place the end of the slider in contact with the neutral point of the resistor layer. Since the eccentric pin does not spontaneously loosen, the reliability of the steering torque detector is high.

It is a still further object of the present invention to provide a steering torque detector in which the frictional resistance between the end of the boss of a mounting ring for a slider and the surface of a printed circuit board, which is kept in slip contact with the end of the boss, is diminished to greatly reduce the wear of the boss and the board to much lengthen the life of the detector. The surface of the printed circuit board, which is kept in slip contact with the end of the boss of the mounting ring, is provided with a coating film low in coefficient of friction. As a result, the wear of the surface of the printed circuit board and the end of the boss is greatly reduced, and the distance between the surface of the board and the inner side of the flange of the mounting ring fitted with the slider is kept nearly constant so that the slider remains in contact with a resistor layer on the board, under nearly constant pressure.

It is a still further object of the present invention to provide a steering torque detector whose brush unit can be easily fitted so that the tip portions of the brushes of the unit do not bend into wrong positions but go into prescribed proper positions on corresponding slip rings. The brush holder of the brush unit has side guide portions extending downward. The height of each of the side guide portions of the brush holder is such that before the tips of the brushes come into contact with the slip rings in fitting the brush unit in a hosing, the bottoms of the side guide portions are put into the insertion hole of the housing. The side guide portions are thus put into the insertion hole to properly position the brush unit in the axial and circumferential directions of the housing to prevent the brushes from bending at the tips thereof. For that reason, the brush in it can be easily fitted in the housing to place the tip portions of the brushes in the prescribed proper positions on the corresponding slip rings.

DETAILED DESCRIPTION OF THE PREFERRED EMBODIMENTS

Embodiments of the present invention will be described in detail with reference to the drawings attached hereto.

Figure 8:
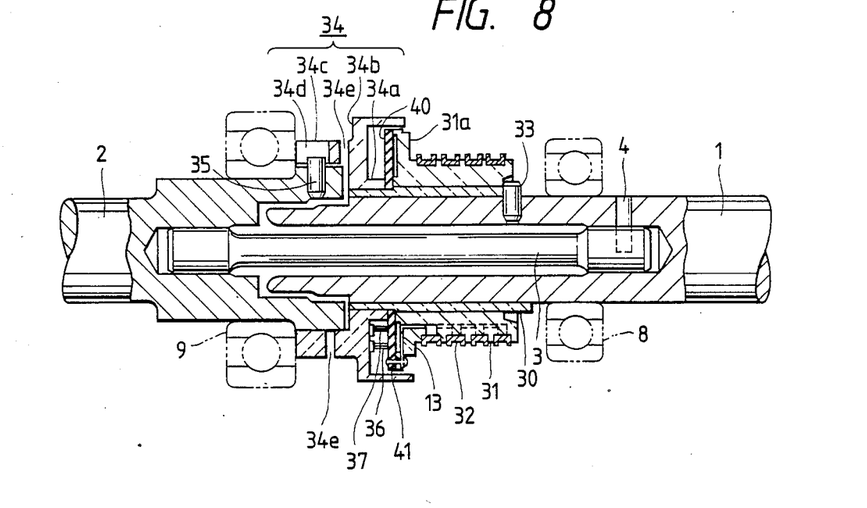
FIG. 8 shows a longitudinally sectional vies of a major part of a steering torque detector according to the present invention.

FIG. 8 shows a longitudinally sectional view of a major part of a steering torque detector which is one of the embodiments and is for a steering gear. In the detector, the input and output steering shafts 1 and 2 of the steering gear are coupled to each other by a torsion bar 3 secured to the input steering shaft by a pin 4, and are supported by bearings 8 and 9. A bushing 30 made of a metal is fitted on the input steering shaft 1. A support ring 31 is molded from a synthetic resin, on the outside circumferential surface of the bushing 30, and has a flange 31a at one end of the ring. Slip rings 32 are embedded in the support ring 31. A pin 33 is secured to the input steering shaft 1 and engaged with the support ring 31 to determine the positions of the slip rings 32 in the circumferential direction of the detector. A brush unit is provided in contact with the slip rings 32 but not shown in the drawings. A printed circuit board 40 made of an electric insulator such as ceramic and shaped as a disk is fitted on the bushing 30 and secured to the flange 31a of the support ring 31.

Figure 9:
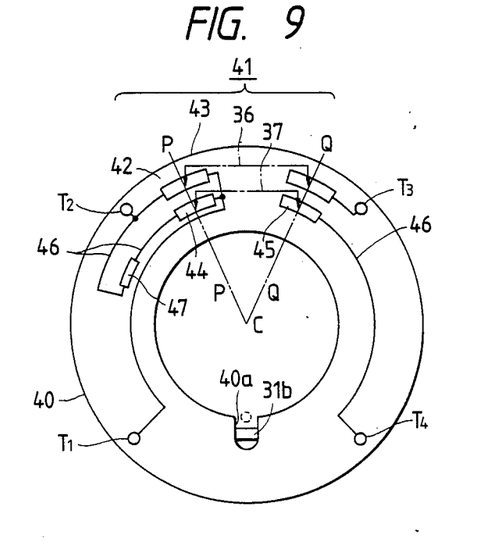
FIG. 9 shows a front view of the printed circuit board of the steering torque detector according to the present invention.

FIG. 9 shows one side of the printed circuit board 40, on which elements 41 of a potentiometer having a main circuit and an auxiliary circuit are provided along mutually concentric circles. The potentiometer elements 41 include the resistor layer 42 and electrode 43 of the main circuit, and the resistor layer 44 and electrode 45 of the auxiliary circuit. The resistor layers 42 and 44 are located at a distance from each other in the radial direction of the detector, and extend along mutually concentric circles, throughout the same range of central angle of the cross section of the detector. The electrodes 43 and 45 are also located at a distance from each other in the radial direction of the detector, and extend along the mutually concentric circles, throughout the same range of central angle of the cross section of the detector. An adjusting resistor 47 may be arranged to be coupled in series with the resistor layer 44. A positive power input terminal T1 and a negative power input terminal T2, which are connected to a detecting power supply through wires 46, a signal output terminal T3 for the main circuit and a signal output terminal T4 for the auxiliary circuit are provided on the printed circuit board 40 and connected to the potentiometer elements 41 through other wires 46. Wires 13 extending from the slip rings 32 as shown in FIG. 8 are connected to the terminals T1, T2, T3 and T4. The printed circuit board 40 has a notch 40a engaged with the positioning projecting 31b (shown by a one-dot chain line in FIG. 9 of the flange 31a of the support ring 31 to position the board to the ring in the circumferential direction of the detector.

The adjusting resistor 47 is manufactured on the printed circuit board 40 by baking. When the steering torque detector is assembled, the main and auxiliary circuits of the potentiometer are measured so that if the detection signals of the circuits are not equal to each other in level, the adjusting resistor 47 is partially cut to a resistance necessary to equalize the signals to each other in level.

As shown in FIG. 8, a mounting ring 34 made of a synthetic resin has a boss 34a movably fitted on the bushing 30 and supported concentrically thereto. A main slider 36 and an auxiliary slider 37 are attached to one side of the flange 34b of the mounting ring 34 and located in an outer and an inner positions thereon so that the ends of the sliders are elastically kept in contact with the corresponding elements 41 of the potentiometer. The mounting ring 34 has a cylindrical projecting portion 34c extending from the other side of the flange 34b in the axial direction of the ring and having an engaging groove 34d. An engaging pin 35 is secured to the output steering shaft 2 and fitted in the engaging groove 34d of the mounting ring 34 so that the position of the ring is determined relative to the shaft in the circumferential direction of the detector, and the ring can be turned together with the shaft. The projecting portion 34c of the ring 34 has a plurality of slits 34e extending in the circumferential direction of the ring throughout wide ranges of central angle of the cross section of the ring and located opposite each other by a central angle of 180°, on the diameter of the ring, so that the projecting portion can be elastically expanded and compressed in the axial direction of the ring. The mounting ring 34 is fitted on the inner race of the bearing 9 for the output steering shaft 2 so that the projecting portion 34c of the ring is elastically compressed and the end of the boss 34a of the ring is pushed on the side of the printed circuit board 40, in advance.

Figure 10A:
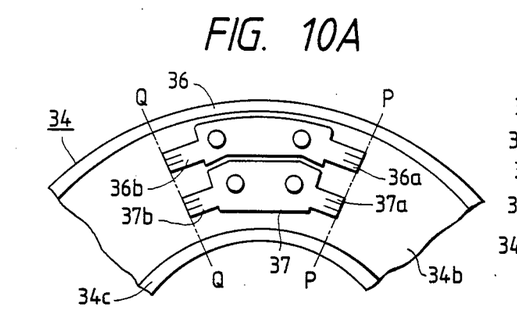
FIG. 10A shows a front view of a part of the mounting ring of the steering torque detector according to the present invention.
Figure 10B:
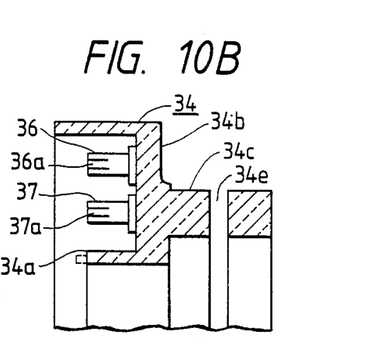
FIG. 10B shows a longitudinally sectional view of the part of the mounting ring according to the present invention.

FIG. 10A and 10B show the mounting ring 34 and the outer and the inner sliders 36 and 37 which are located at a distance from each other in the radial direction of the detector and extend along mutually concentric circles so that the ends 36a and 37a of the sliders are on the radius P—P of the cross section of the detector and the other ends 36b and 37b of the sliders are on the other radius Q—Q of the cross section of the detector.

Figure 11:
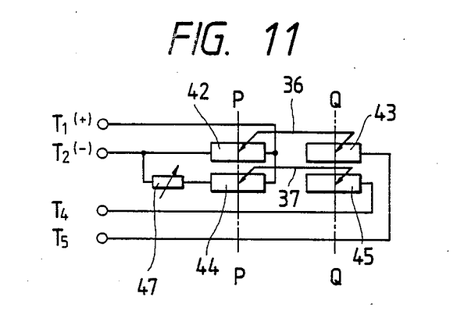
FIG. 11 shows a wiring diagram of the potentiometer of the steering torque detector according to the present invention.

FIG. 11 shows the main and auxiliary circuits of the potentiometer composed of the potentiometer elements 41 and the sliders 36 and 37. The slider 36 extends from the resistor layer 42 to the electrode 43 and is in contact with them. The other slider 37 extends from the resistor layer 44 to the electrode 45 and is in contact with them. When the steering wheel of the steering gear is not moved, the ends 36a and 37a of the sliders 36 and 37 are on the neutral points of the resistor layers 42 and 44, which are on the radius P—P of the cross section of the detector. The above-described preadjustment with the adjusting resistor 47 is performed so that the detection signals of the main and auxiliary circuits of the potentiometer are equal to each other in level when the resistor layers 42 and 44 are normal.

In the above-described detector, when the steering wheel is moved, the torsion bar 3 is twisted so that the ends 36a and 37a of the sliders 36 and 37 are displaced by the same angle on the resistor layers 42 and 44, depending on the quantity of the twisting of the torsion bar. Since the detection signals of the main and the auxiliary circuits of the potentiometer are equal to each other in level in that case, the main circuit is judged to be normal. If the detection signals are not equal to each other, the main circuit is judged to be abnormal and a warning is sounded or displayed to shift the steering gear to manual operation.

Since the mutually corresponding ends 36a and 37a of the main and the auxiliary sliders 36 and 37 are on the same radius of the cross section of the detector and the main and the auxiliary resistor layers 42 and 44 extend along the mutually concentric circles throughout the same range of central angle of the cross section of the detector, as mentioned above, the steering torque of the steering gear can be accurately detected by the detector even if the mounting ring 34 and the printed circuit board 40 become eccentric to each other.

Further, in this detector, when the steering wheel is moved, the torsion bar 3 is twisted so that the detection signals whose levels depend on the quantity of the twisting are sent out from the main and auxiliary circuits of the potentiometer. Since the preadjustment is performed with the adjusting resistor as mentioned above, it can be surely judged from the signals whether the main and the auxiliary circuits are normal or abnormal. If it is judged that the circuits are abnormal, a warning is sounded or displayed.

A method of forming and assembling the main and auxiliary sliders of a steering torque detector for a steering gear will be described with reference to FIG. 12 from now on.

Figure 12:
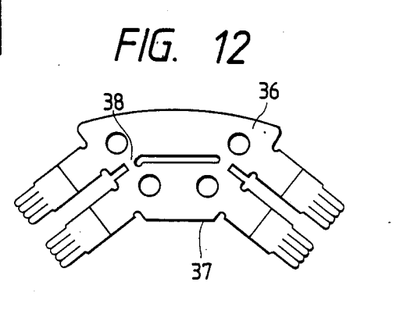
FIG. 12 shows a front view of a main and an auxiliary sliders formed by punching in a method of the present invention.

The sliders 36 and 37 are formed together along each other by punching as the sliders remain coupled to each other at joints 38 of small width as shown in FIG. 12. The sliders 36 and 37 are then attached to one end of a mounting ring 34 by calking or the like, as shown in FIG. 10A, so that the ends 36a and 37a of the sliders are on the same radius P—P of the cross section of the detector and the other ends of the sliders are one the other same radius Q—Q of the cross section of the detector. After that, the joints 38 are cut off so that the main and the auxiliary sliders 36 and 37 are uncoupled from teach other. This results in preventing a position detection phase difference from being caused between the main and the auxiliary circuits of the potentiometer of the steering torque detector.

In the above-described detector, although the adjusting resistor 47 is connected in series with the resistor layer 44 of the auxiliary circuit of the potentiometer, the present invention is not confined thereto but may be otherwise embodied so that the adjusting resistor is connected in series with the resistor layer 42 of the main circuit of the potentiometer.

Although the adjusting resistor 47 is provided on the printed circuit board 40 before the measurement of the main and auxiliary circuits of the potentiometer in the above-described embodiment, the present invention is not confined thereto but may be otherwise embodied so that the resistance of the adjusting resistor is determined from the result of the measurement and the resistor having the determined resistance is thereafter provided on the printed circuit board and connected in series with the resistor layer 42 or 44. Besides, the adjusting resistor 47 may not be provided on the printed circuit board 40 but may be provided in an external position and connected to the resistor layer 42 or 44 through a wire.

Although the slip rings 32 and the printed circuit board 4 are attached to the input steering shaft 1 and the mounting ring 34 is attached to the output steering shaft 2 in the above-described embodiment, the slip rings and the printed circuit board may be attached to the output steering shaft and the mounting ring may be attached to the input steering shaft.

Although the detection signals are sent out from the printed circuit board 40 to a fixed section through the slip rings 32 and the brush unit in the above-described embodiment, the present invention is not confined thereto but may be otherwise embodied so that signal transmission wires are spirally and flexibly laid from the printed circuit board in the radial direction of the detector and connected to the terminals of the fixed section to send out the detection signals from the board to the section through the wires.

Figure 13:
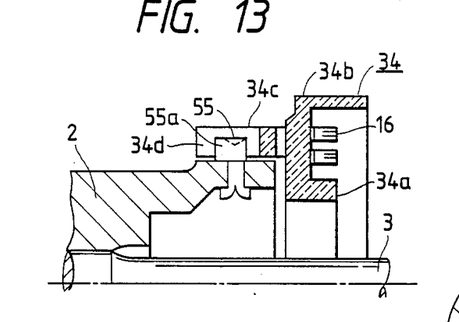
FIG. 13 shows a longitudinally sectional view indicative of a means engaged with the mounting ring of the steering torque detector to determine the position of the ring in the circumferential direction of the detector.
Figure 14:
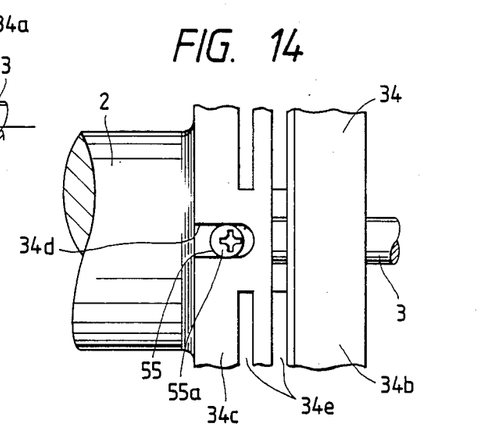
FIG. 14 shows a plan view indicative of the means shown in FIG. 13.

FIGS. 13 and 14 show the other embodiment of the present invention in which the mounting ring 34 has a cylindrical projecting portion 34c extending from the outer side of the flange 34b in the axial direction of the ring and having an engaging groove 34d extending from the outer end of the projecting portion in the axial direction thereof. An eccentric pin 55 is calked to the output steering shaft 2 and engaged in the engaging groove 34d so that the mounting ring 34 is unmovable relative to the shaft in the circumferential direction thereof. The projecting portion 34c has a plurality of slits 34e juxtaposed in the axial direction of the portion and extending in the circumferential direction thereof throughout wide ranges of central angle thereof. The slits 34e are located opposite each other by a central angle of 180°, on the diameter of the projecting portion 34c, so that the portion can be elastically expanded and compressed in the axial direction thereof. The head 55a of the eccentric pin 55 is eccentric to the shank thereof and calked to the output steering shaft 2 so tightly that the pin cannot be turned and loosened without using a wrench to which a strong turning force is applied.

The eccentric pin 55 of the steering torque detector is turned by the wrench to rotate the mounting ring 34 relative to the output steering shaft 2 in the circumferential direction thereof to finely adjust the position of the ring in that direction to place the end of the slider 16 on the neutral point of the resistor layer. The weight of the mounting ring 34 is low, the angle of the twisting of the torsion bar 3 at the movement of the steering wheel of the steering gear and the angle of turning of the mounting ring under the twisting of the torsion bar are small, and the inertial force of the ring is low. For that reason, the eccentric pin 55 is not turned by the twisting of the torsion bar 3.

Although the slip rings 32 and the printed circuit board 14 are attached to the input steering shaft 1 and the mounting ring 34 is attached to the output steering shaft 2 in the above-described embodiment, the slip rings and the printed circuit board may be attached to the output steering shaft and the mounting ring may be attached to the input steering shaft.

In the above-described embodiment, a detection signal is sent out from the printed circuit board 14 to a fixed section through the slip rings 32 and a brush unit not shown in the drawings. However, the present invention is not confined thereto but may be otherwise embodied so that signal transmission wires are spirally and flexibly laid from the printed circuit board in the radial direction thereof and connected to the terminals of the fixed section to send out the detection signal from the board to the section through the wires.

An embodiment of the present invention is hereafter described in detail with reference to the drawings attached hereto.

Figure 15:
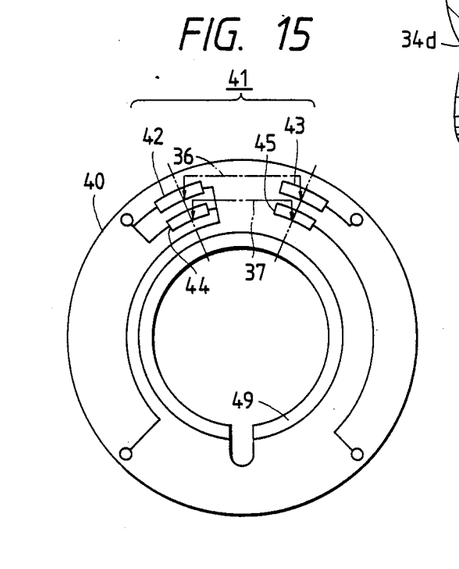
FIG. 15 shows a front view of the printed circuit board of a steering torque detector according to the present invention.
Figure 16:
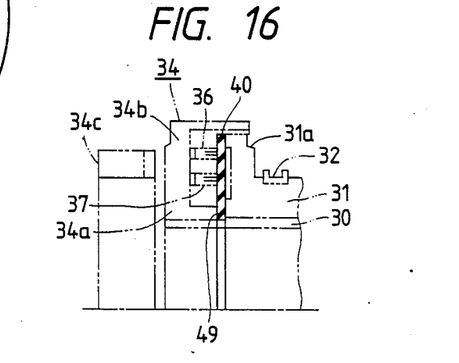
FIG. 16 shows a sectional view of the printed circuit board according to the present inventions.

FIG. 15 shows a front view of the printed circuit board 40 of a steering torque detector which is the embodiment. FIG. 16 shows a sectional view of the printed circuit board 40. The surface of the printed circuit board 40 is provided with an annular coating film 49 low in coefficient of friction, by glass coating, for example, so that the boss 34a of a mounting ring 34 is placed in contact with the film. Elements 41 of a potentiometer having a main and an auxiliary circuits are provided on the printed circuit board 40. Some of the elements 41 are the resistor layer 42 and electrode 43 of the main circuit, and the others of the elements are the resistor layer 44 and electrode 55 of the auxiliary circuit. Sliders 36 and 37 are attached to the mounting ring 34 and kept in contact with the resistor layers 42 and 44 and the electrodes 43 and 45. The resistor layers 42 and 44 are manufactured by carbon printing. In the other respects, the steering torque detector is equivalent to the steering torque detector described above.

Since the film 49 low in coefficient of friction is provided on the surface of the printed circuit board 40 and kept in slipping pressure contact with the end of the boss 34a, the frictional resistance between the board and the boss is diminished. This results in lengthening the life of the steering torque detector.

The film 49 may be manufactured by carbon printing. In that case, the film 49 can be manufactured at the same time as the resistor layers 42 and 44, to improved the productivity for the steering torque detector.

Although the printed circuit board 40 and slip rings 32 are attached to an input steering shaft 1 and the mounting ring 34 is attached to an output steering shaft 2 in the above-described embodiment, the printed circuit board and the slip rings may be attached to the output steering shaft and the mounting ring may be attached to the input steering shaft.

Although detection signals are sent out from the printed circuit board 40 to a fixed section through the slip rings 32 and a brush unit in the above-described embodiment, the present invention is not confined thereto but may be otherwise embodied so that signal transmission wires are spirally and flexibly laid from the printed circuit board in the radial direction thereof and connected to the terminals of the fixed section to send out the detection signals from the board to the section through the wires.

Figure 17:
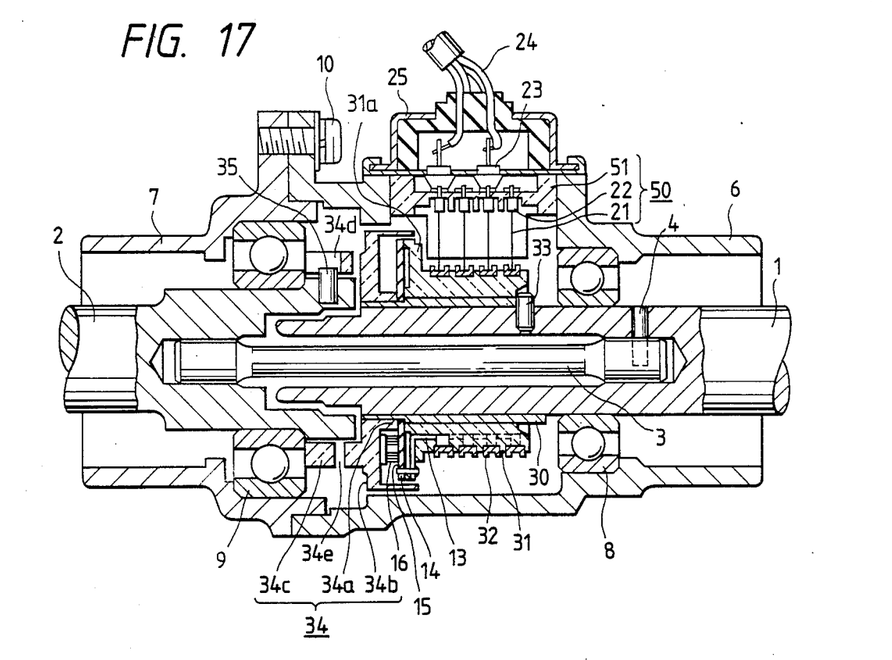
FIG. 17 shows a longitudinally sectional view of a steering torque detector according to the present invention.
Figure 18:
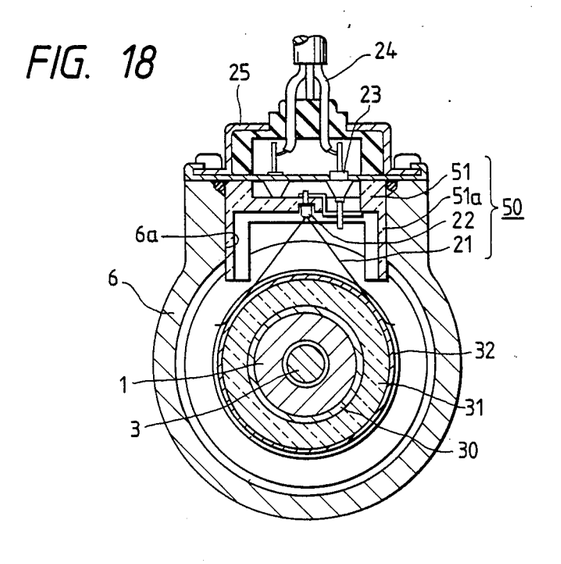
FIG. 18 shows a cross-sectional view of the steering torque detector.

FIG. 17 shows a longitudinally sectional view of a steering torque detector which is one of the embodiments. FIG. 18 shows a cross-sectional view of the detector. In the detector, an input steering shaft 1, an output steering shaft 2, a torsion bar 3, a secured pin 4, housings 6 and 7, bearings 8 and 9, a screw 10, electric wires 13, a printed circuit board 14, potentiometer elements 15, a slider 16, brushes 21, terminals 22, capacitors 23, lead wires 24 and cover 25 are disposed or manufactured equivalently to the above-described conventional steering torque detector. In the detector which is the embodiment, a bushing 30 made of a metal tube or the like is fitted on the input steering shaft 1, and a support ring 31 for slip rings 32 is molded from a synthetic resin on the peripheral surface of the bushing and has a flange 31a at one end of the support ring. The slip rings 32 are embedded in the support ring 31. The slip ring embedding portion of the support ring 31 is fitted to the input steering shaft 1 through the medium of the bushing 30 and positioned relative to the shaft in the circumferential direction thereof by a secured pin 33. A mounting ring 34 is made of a soft synthetic resin and has a boss 34a movably fitted on the bushing 30 and supported concentrically thereto. The slider 16 is attached to the inner end of the flange 34b of the mounting ring 34 and has the end elastically kept in contact with a resistor layer which is one of the potentiometer elements 15 provided on the printed circuit board 14. A cylindrical projecting portion 34c extends from the outer end of the flange 34b of the mounting ring 34 and has the outer end borne on the end of the inner race of the bearing 9. An engaging groove 34d is provided in the projecting portion 34c and extends from the outer end thereof. An engaging pin 35 secured to the output steering shaft 2 is fitted in the engaging groove 34d so that the mounting ring 34 is turned together with the output steering shaft 2. The cylindrical projecting portion 34c has a plurality of slits 34e juxtaposed in the axial direction of the portion and extending in the circumferential direction of the portion throughout wide ranges of central angle thereof, so that the portion can be elastically expanded and compressed in the axial direction thereof. The mounting ring 34 is interposed between the inner race of the bearing 9 and the printed circuit board 14 in such a manner that the projecting portion 34c is compressed. As a result, the end of the boss 34a of the ring 34 is pushed on the printed circuit board 14 in advance so that the slider 16 is elastically kept in contact with the resistor layer and an electrode which are included in the potentiometer elements 15.

Figure 19:
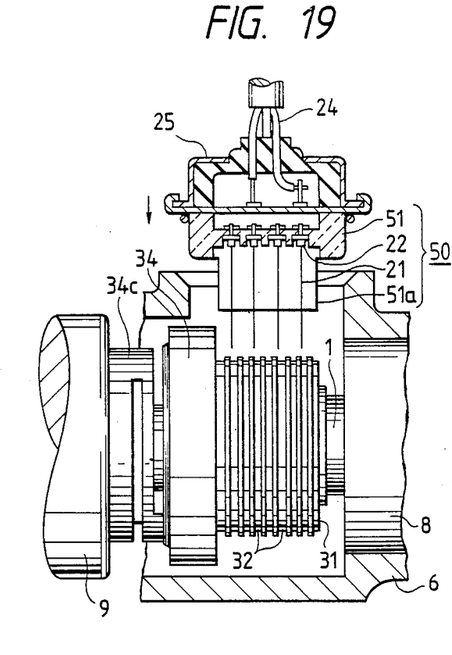
FIG. 19 shows a longitudinally sectional view of a major part of the steering torque detector whose brush unit has begun to be put into the insertion hole of a housing.
Figure 20:
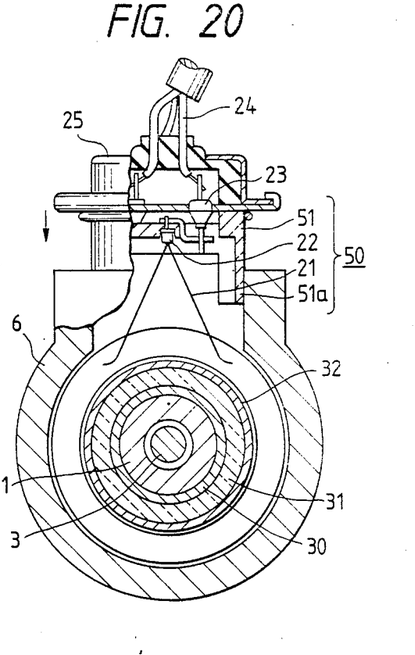
FIG. 20 shows a cross-sectional view of the major part of the steering torque detector whose brush unit has begun to be put into the insertion hole of the housing.

The brush unit 50 of the steering torque detector includes the brushes 21 made of highly-electroconductive thin wires secured at the butts thereof to the terminals 22 and divergently extending in two mutually different directions from the butts of the wires toward the tips thereof in each brush, and a brush holder 51 which is made of a synthetic resin and in which the terminals are embeded. The brush unit 50 is attached to the housing 6 as shown in FIG. 18. The side surfaces of the brush holder 51 are partially circularly shaped and fitted in the insertion hole 6a of the housing 6. The brush holder 51 has a pair of guide portions 51a extending down at both the sides of the holder toward the slip rings 32. The height of each of the guide portions 51a is such that the tips of the brushes 21 do not come into contact with the slip rings 31 when the guide portions have begun to be put into the insertion hole 6a of the housing 6, as shown in FIGS. 19 and 20. For that reason, the brushes 21 can be easily placed in prescribed proper positions on the corresponding slip rings 32, as shown in FIG. 18.

Figure 21:
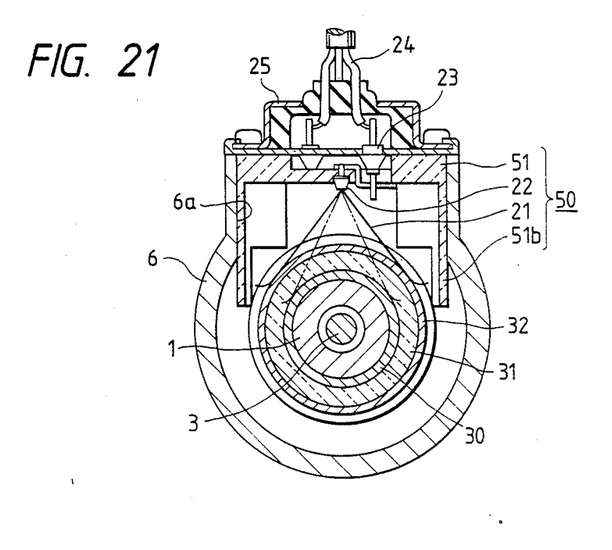
FIG. 21 shows a cross-sectional view of a major part of a steering torque detector with a brush unit fitted in a housing according to the present invention.

FIG. 21 shows a steering torque detector which is the other of the embodiments. The difference of the steering torque detector from that shown in FIGS. 17 through 20 is that the height of each of both side guide portions 51b of the brush holder 51 of a brush unit 50 in the detector shown in FIG. 21 is such that the bottoms of the side guide portions are lower than those of brushes 21 if the brushes are not elastically deformed in contact with slip rings 32 as shown by two-dot chain lines in FIG. 21. As a result, the brushes 21 are prevented from bending or breaking when the brush unit 50 is carried or handled.

Although the slip rings 32 and the printed circuit board 14 are attached to the input steering shaft 1 and the mounting ring 34 is attached to the output steering shaft 2 in each of the above-described embodiments, the slip rings and the printed circuit board may be attached to the output steering shaft and the mounting ring may be attached to the input steering shaft.

As described above, in the steering torque detector according to the present invention, the potentiometer having a main and an auxiliary circuits is formed on the printed circuit board, and the main and the auxiliary resistor layers are located at a distance from each other in the radial direction of the detector and extend along mutually concentric circles, throughout the same angle of central angle of the cross section of the detector. Further, the main and auxiliary sliders are attached to the mounting ring and kept in contact with the main and the auxiliary resistor layers at the ends of the sliders so that the ends thereof are on the radius of the detector. As a result, the detections of the main and the auxiliary circuits are increased in accuracy and reliable so that the accuracy of the output characteristic of the detector does not fall even if the resistor layers and the sliders are eccentric to each other.

Also, in the method of assembling the steering torque detector according to the present invention, the main and the auxiliary sliders are integrately formed so that they are arranged in parallel with and coupled to each other through a joint located on the halfway portion of the sliders and after the sliders are then attached to the mounting ring, the joint is cut off so that they are uncoupled from each other. As a result, it is made easy to assemble the steering torque detector so that the main and the auxiliary sliders extend along mutually concentric circles and the mutually corresponding ends of the sliders are accurately placed at the same untral angle.

Also, as described above, according to the present invention, an adjusting resistor is arranged to be connected in series with the resistor layer of one of the main and the auxiliary circuits and to be preadjustable to equalize the detection signals of the main and auxiliary circuits to each other in level so as to enable the ruducsion in the accuracy of processing and assembly of the component of the detector to enhance the productivity therefor. Besides, since it can be surely judged whether the main and the axially circuits are normal or abnormal when a steering wheel is moved, the reliability of the detector is enhanced.

Further, as described above, according to the present invention, an eccentric pin is calked to one shaft, and engaged in the engaging groove which is provided in the cylindrical projecting portion of the mounting ring to determine the position of the ring relative to the one shaft in the circumferential direction thereof as that the position of the mounting ring is finely adjustable in the circumferential direction thereof by the turning of the eccentric pin. For that reason, it is easy to finely adjust the end of the slider in the neutral point of the resistor layer of the potentiometer provided on the printed circuit board. Also, the eccentric pin does not spontaneously loosen, the reliability of the steering torque detector is heightened.

Further, as described above, according to the present invention, the surface of the printed circuit board, which is kept in slip contact with the end of the boss of the mounting ring, is provided with a wating film low in coefficient of friction. As a result, the wear of the surface of the printed circuit board and the end of the boss is greatly reduced and the durability of the printed circuit board is greatly heightened.

Still further, according to the present invention, the brush holder has side guide portions extending downward. The height of each side guide portion is such that before the tips of the brushes come into contact with the slip rings in fitting the brush unit in a housing, the bottoms of the side guide portions are put into the insertion hole of the housing. Accordingly, the side guide portions are thus put into the insertion hole to properly position the brush unit in the axial and circumferential directions of the housing to prevent the brushes from bending at the tips thereof. For that reason, the frush unit can be easily fitted in the housing to place the tip portions of the brushes in the prescribed proper positions on the corresponding slip rings.

What is claimed is:

1. A steering torque detector, comprising:
input steering shaft means;
output steering shaft means;
fixed section means;
torsion bar means which couples said input and output steering shaft means to each other;
printed circuit board means attached to one of said input and output steering shaft means, and having resistor layers and electrodes on one side thereof as elements of a potentiometer;
means provided between said one steering shaft means and said fixed section means to send out detection signals from said printed circuit board means to said fixed section means;
mounting ring means made of an electric insulator and fitted around both said input and output steering shaft means, said mounting ring means being provided with a flange means turned together by the other steering shaft means; and
slider means attached to said flange means of said mounting ring means and elastically kept in contact with said resistor layers of said potentiometer at the ends of said slider means;
wherein said potentiometer comprises a main circuit and an auxiliary circuit each having one of said resistor layers and one of said electrodes, said resistor layers of both said main and said auxiliary circuits being located at a distance from each other in the radial direction of said detector and extending along mutually concentric circles through the same range of central angle of the cross section of said detector; and said slider means comprises a main slider having one end which is elastically kept in contact with said one of said resistor layers of said main circuit and an auxiliary slider having one end which is elastically kept in contact with said one of said resistor layers of said auxiliary circuit, both said main and said auxiliary sliders being located at a distance from each other in the radial direction of said detector and extending along mutually concentric circles so that said one ends of both said main and said auxiliary sliders are positioned along a same radial direction of said detector.

2. A steering torque detector as claimed in claim 1, further comprising adjusting resistor means connected to one of said resistor layers of said main and auxiliary circuits for performing preadjustment to equalize the detection signals of said main and auxiliary circuit to each other in level.

3. A steering torque detector, comprising:
input steering shaft means;
output steering shaft means;
fixed section means;
torsion bar means which couples said input and output steering shaft means to each other;
printed circuit board means attached to one of said input and output steering shaft means, and having resistor layers and electrodes on one side thereof as elements of a potentiometer;
means provided between said one steering shaft means and said fixed section means to send out detection signals from said printed circuit board means to said fixed section means;
mounting ring means made of an electric insulator and fitted around both said input and output steering shaft means, said mounting ring means being provided with a flange means turned together by the other steering shaft means; and
slider means attached to said flange means of said mounting ring means and elastically kept in contact with said resistor layers of said potentiometer at the ends of said slider means;
wherein said mounting ring means is made of synthetic resin and comprises a boss movably fitted to said one steering shaft means and supported concentrically thereto, said flange extending from said boss and fitted with said slider means on the inner side thereof, and a cylindrical projecting portion extending from the outer side of said flange in the axial direction of said mounting ring means and provided with an engaging groove extending from the outer end thereof; and
an eccentric pin which has a head eccentric to the shank of said pin, and is calked to said the other steering shaft means and fitted in said engaging groove of said cylindrical projecting portion to position said mounting ring means relative to said the other steering shaft means in the circumferential direction thereof so that said pin is turned to rotate said mounting ring means to finely adjust the position thereof relative to said the other steering shaft means in the circumferential direction thereof.

4. A steering torque detector, comprising:
input steering shaft means;
output steering shaft means;
fixed section means;
torsion bar means which couples said input and output steering shaft means to each other;
printed circuit board means attached to one of said input and output steering shaft means, and having resistor layers and electrodes on one side thereof as elements of a potentiometer;
means provided between said one steering shaft means and said fixed section means to send out detection signals from said printed circuit board means to said fixed section means;
mounting ring means made of an electric insulator and fitted around both said input and output steering shaft means, said mounting ring means being provided with a flange means turned together by the other steering shaft means;
slider means attached to said flange means of said mounting ring means and elastically kept in contact with said resistor layers of said potentiometer at the ends of said slider means, wherein said mounting ring means comprises a boss movably fitted to said one shaft means and supported concentrically thereto, said flange fitted with said slider means on the inner side thereof, and a cylindrical projecting portion extending from the outer side of said flange in the axial direction of said mounting ring means and engaged in the circumferential direction of said other steering shaft means not supporting said printed circuit board means;
pressure means for pushing said mounting ring means on said printed circuit board means so that one end of said boss prepresses the surface of said printed circuit board means; and
coating film means being low in coefficient of friction and provided on the surface of said printed circuit board means, which is kept in contact with the end of said boss.

5. A steering torque detector, comprising:
an input steering shaft;
an output steering shaft;
a torsion bar which couples said shafts to each other;
a printed circuit board which is attached to one of said shafts and on one side of which a resistor layer and electrodes, which are elements of a potentiometer, are provided;
slip rings attached to said one shaft and connected to a circuit of said elements;
a brush unit which has brushes each made of thin wires divergently extending in two mutually different directions from the butts of said wires toward the tips thereof and kept in contact with said slip ring at said tips to send out a detection signal from said potentiometer;
a mounting ring made of an electric insulator and fitted around both said shafts so that said mounting ring is turned together with one of said shafts not supporting said printed circuit board; and
a slider attached to the flange of said mounting ring and having one end elastically kept in contact with said resistor layer in such a manner that the length of the area of said contact in the circumferential direction of said detector is very small, wherein said brush unit includes a brush holder made of an electric insulator and supporting said brushes at the butts thereof; and said holder is fitted in the insertion hole of a housing supporting said one shaft and has side guide portions extending downward and each having such a height that said brushes come into contact with said slip rings after the bottoms of said guide portions are put into said hole.

* * * * *